United States Patent
Barbu et al.

(10) Patent No.: US 12,553,981 B2
(45) Date of Patent: Feb. 17, 2026

(54) DEVICE POSITIONING

(71) Applicant: NOKIA TECHNOLOGIES OY, Espoo (FI)

(72) Inventors: Oana-Elena Barbu, Aalborg (DK); Diomidis Michalopoulos, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 539 days.

(21) Appl. No.: 18/060,914

(22) Filed: Dec. 1, 2022

(65) Prior Publication Data
US 2023/0176169 A1    Jun. 8, 2023

(30) Foreign Application Priority Data
Dec. 2, 2021    (FI) ..................... 20216241

(51) Int. Cl.
*G01S 5/02* (2010.01)
*G01S 13/72* (2006.01)

(52) U.S. Cl.
CPC ............ G01S 5/0218 (2020.05); G01S 13/72 (2013.01)

(58) Field of Classification Search
CPC .... G01S 5/0218; G01S 13/72; G01S 5/02521; G01S 5/0036; G01S 5/12; G01S 1/02; G01S 1/20; G01S 5/0045; G01S 5/0252; G01S 5/02524; H04W 64/00
See application file for complete search history.

(56) References Cited

U.S. PATENT DOCUMENTS

| | | | |
|---|---|---|---|
| 9,026,151 B2 | 5/2015 | Opshaug et al. |
| 2001/0053699 A1 | 12/2001 | McCrady et al. |
| 2011/0158361 A1 | 6/2011 | Dent et al. |
| 2012/0122470 A1 | 5/2012 | Germond et al. |

(Continued)

FOREIGN PATENT DOCUMENTS

| | | |
|---|---|---|
| CN | 109782223 B | 5/2019 |
| CN | 113156365 A | 7/2021 |

OTHER PUBLICATIONS

Office Action for European Application No. 22209809.7 dated Nov. 15, 2024, 9 pages.

(Continued)

*Primary Examiner* — Christopher M Brandt
*Assistant Examiner* — Michael McInnis
(74) *Attorney, Agent, or Firm* — ALSTON & BIRD LLP

(57) ABSTRACT

Apparatus and methods for apparatus positioning are provided. Solution includes receiving (300) by an apparatus from a network element a signal having multipath propagated signal components and obtaining time domain samples of the multipath propagated signal components, mapping (302) the time domain samples to one or more frequency offset-delay pairs to obtain frequency offsets and delays of the received multipath propagated signal components, calculating (304) angle of arrival of one or more multipath propagated signal components, determining (306) the multipath propagated signal component corresponding to the direct propagation path between the apparatus and the network element, and controlling (308) the utilisation of the angle of arrival and delay of the multipath propagated signal component corresponding to the direct propagation path in the determination of the location of the apparatus.

20 Claims, 6 Drawing Sheets

(56) References Cited

U.S. PATENT DOCUMENTS

| | | | |
|---|---|---|---|
| 2017/0288710 | A1 | 10/2017 | Delfeld et al. |
| 2018/0365975 | A1* | 12/2018 | Xu .................. G08B 29/185 |
| 2020/0195476 | A1* | 6/2020 | Chu .................. H04B 1/7093 |
| 2020/0200863 | A1 | 6/2020 | Booij |
| 2020/0333472 | A1 | 10/2020 | Marshall et al. |
| 2021/0321221 | A1* | 10/2021 | Yerramalli ............ H04L 25/022 |
| 2024/0057019 | A1* | 2/2024 | Barbu .................. G01S 5/0273 |

OTHER PUBLICATIONS

"3rd Generation Partnership Project; Technical Specification Group Radio Access Network; Location Measurement Unit (LMU) performance specification; User Equipment (UE) positioning in UTRAN (Release 16)", 3GPP TS 25.111 v16.0.0, (Jun. 2020), 17 pages.

"3rd Generation Partnership Project; Technical Specification Group Services and System Aspects; Service requirements for the 5G system; Stage 1 (Release 18)", 3GPP TS 22.261 v18.4.0, (Sep. 2021), 107 pages.

"3rd Generation Partnership Project; Technical Specification Group Services and System Aspects; Study on Communication for Automation in Vertical Domains (Release 16)", 3GPP TR 22.804 v16.3.0, (Jul. 2020), 197 pages.

Extended European Search Report for European Application No. 22209809.7 dated Mar. 22, 2023, 15 pages.

Nerguizian et al., "Geolocation in Mines With an Impulse Response Fingerprinting Technique and Neural Networks", IEEE Transactions on Wireless Communications, vol. 5, No. 3, (Mar. 2006), 9 pages.

Qualcomm Incorporated, "New SID on NR Positioning Enhancements", 3GPP TSG RAN Meeting #86, RP-193237, (Dec. 9-12, 2019), 4 pages.

Singh et al., "Time Delays and Angles of Arrival Estimation using Known Signals", Signal Image and Video Processing 6(2), (Jan. 2012), 19 pages.

Su et al, "Estimation of the Doppler frequency and direction of arrival of the ionospherically propagated HF signals", Radio Science, vol. 44, RS4002, (Jul. 7, 2009), 10 pages.

Office Action for Finland Application No. 20216241 dated Jun. 1, 2022, 7 pages.

Li et al., "Positioning Reference Signal-Orientated Moving Train Localization in Ricean Channel", International Journal of Future Generation Communication and Networking, vol. 9, No. 10, (2016), 10 pages.

\* cited by examiner

DEVICE POSITIONING

CROSS-REFERENCE TO RELATED APPLICATIONS

This application claims priority to Finnish Patent Application No. 20216241, filed Dec. 2, 2021, the entire contents of which are incorporated herein by reference.

FIELD

The exemplary and non-limiting embodiments of the invention relate generally to wireless communication systems. Embodiments of the invention relate especially to apparatuses and methods in wireless communication networks.

BACKGROUND

The use of wireless telecommunication systems has been increasing for several years. In many developed countries almost every grown-up and many children as well use a terminal device of a wireless telecommunication system. The wireless telecommunication systems are under constant development. New services are developed, and older services are enhanced.

Positioning services or utilising the location of terminal devices of users are developed as well. The accuracy of the positioning services should be as high as possible, as the location of a terminal device may be utilised not only in commercial services but also in emergency situations.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there are provided apparatuses of certain claims.

According to an aspect of the present invention, there is provided a communication system of other claims.

According to an aspect of the present invention, there is provided method of additional claims.

According to an aspect of the present invention, there is provided a computer program of another claim.

One or more examples of implementations are set forth in more detail in the accompanying drawings and the description below. Other features will be apparent from the description and drawings, and from the claims. The embodiments and/or examples and features, if any, described in this specification that do not fall under the scope of the independent claims are to be interpreted as examples useful for understanding various embodiments of the invention.

LIST OF DRAWINGS

Embodiments of the present invention are described below, by way of example only, with reference to the accompanying drawings, in which FIGS. 1 and 2 illustrate examples of simplified system architecture of a communication system;

DESCRIPTION OF SOME EMBODIMENTS

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain features, structures, units, modules etc. that have not been specifically mentioned.

Some embodiments of the present invention are applicable to a user terminal, a communication device, a base station, eNodeB, gNodeB, a distributed realisation of a base station, a network element of a communication system, a corresponding component, and/or to any communication system or any combination of different communication systems that support required functionality.

The protocols used, the specifications of communication systems, servers and user equipment, especially in wireless communication, develop rapidly. Such development may require extra changes to an embodiment. Therefore, all words and expressions should be interpreted broadly and they are intended to illustrate, not to restrict, embodiments.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. The embodiments may also be applied to other kinds of communications networks having suitable means by adjusting parameters and procedures appropriately. Some examples of other options for suitable systems are the universal mobile telecommunications system (UMTS) radio access network (UTRAN), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
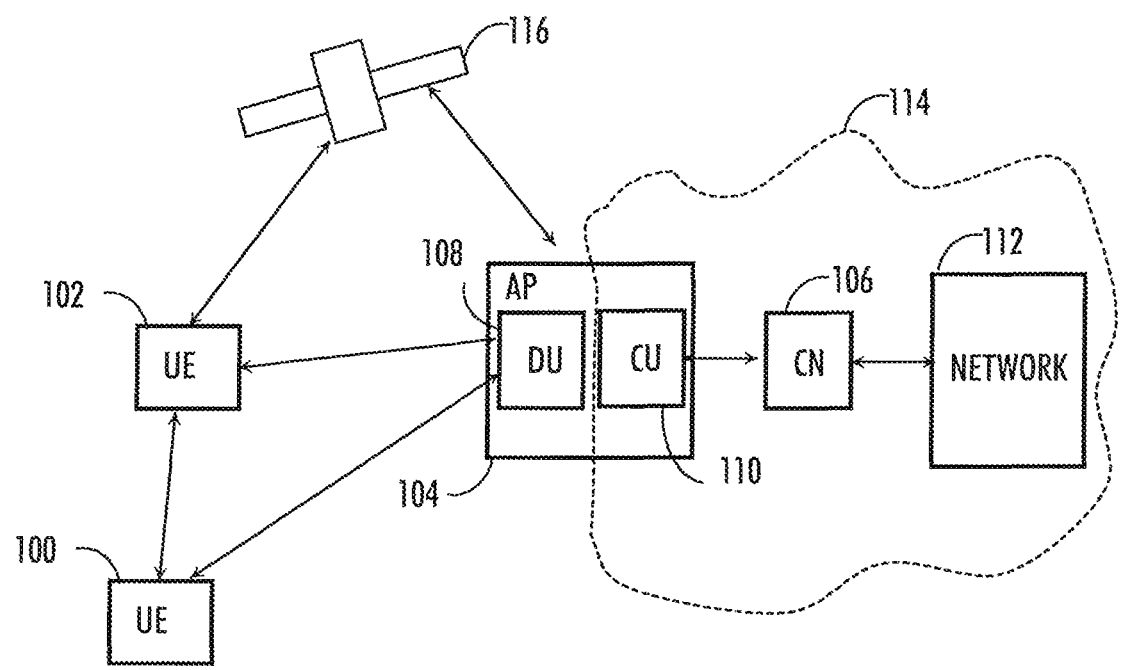

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows devices 100 and 102. The devices 100 and 102 are configured to be in a wireless connection on one or more communication channels with a node 104. The node 104 is further connected to a core network 106. In one example, the node 104 may be an access node such as (e/g)NodeB serving devices in a cell. In one example, the node 104 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 106 (CN or next generation core NGC). Depending on the deployed technology, the (e/g)NodeB is connected to a serving and packet data network gateway (S-GW+P-GW) or user plane function (UPF), for routing and forwarding user data packets and for providing connectivity of devices to one ore more external packet data networks, and to a mobile management entity (MME) or access mobility management function (AMF), for controlling access and mobility of the devices.

Exemplary embodiments of a device are a subscriber unit, a user device, a user equipment (UE), a user terminal, a terminal device, a mobile station, a mobile device, etc The device typically refers to a mobile or static device (e.g. a portable or non-portable computing device) that includes wireless mobile communication devices operating with or without an universal subscriber identification module (USIM), including, but not limited to, the following types of devices: mobile phone, smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones or eyeglasses) and the computation is carried out in the cloud.

The device illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station. The device (or in some embodiments a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected information and communications technology, ICT, devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, e.g. below 6 GHz or above 24 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cm Wave, 6 or above 24 GHz—cmWave and mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 112, such as a public switched telephone network, or a VoIP network, or the Internet, or a private network, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

The technology of Edge cloud may be brought into a radio access network (RAN) by utilizing network function virtualization (NFV) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at or close to a remote antenna site (in a distributed unit, DU 108) and non-real time functions being carried out in a centralized manner (in a centralized unit, CU 110).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, Mobile Broadband, (MBB) or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node or by a gNB located on-ground or in a satellite.

It is obvious for a person skilled in the art that the depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
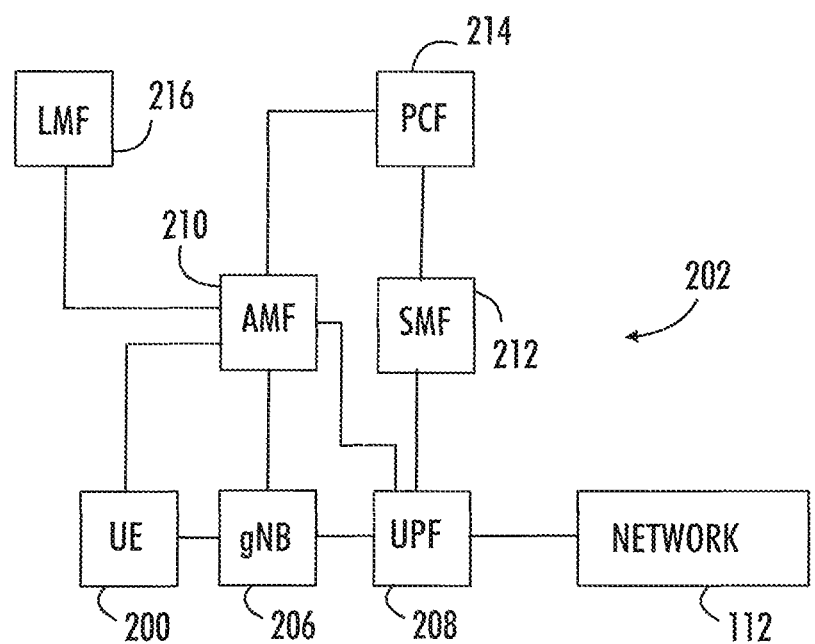

FIG. 2 illustrates an example of a communication system based on 5G network components. A terminal device, user terminal or user equipment 200 communicating via a 5G network 202 with a data network 112. The user terminal 200 is connected to a Radio Access Network RAN node, such as (e/g)NodeB 206 which provides the user terminal with a connection to the network 112 via one or more User Plane Functions, UPF 208. The user terminal 200 is further connected to Core Access and Mobility Management Function, AMF 210, which is a control plane core connector for (radio) access network and can be seen from this perspective as the 5G version of Mobility Management Entity, MME, in LTE. The 5G network further comprises Session Management Function, SMF 212, which is responsible for subscriber sessions, such as session establishment, modify and release, and a Policy Control Function, PCF 214 which is configured to govern network behavior by providing policy rules to control plane functions. The 5G network may further comprise a location management function, LMF 216, which may be configured to determine the location of the terminal device 200 based on information received from the terminal device and/or gNB 206.

In the development of wireless systems such as NR or 5G, positioning services have been seen as an important feature. Numerous commercial services many utilise position information of terminal devices. Also in emergency situations it may be useful to determine the location of a user carrying a terminal device. In some jurisdictions, wireless communication systems are required to fulfil requirements regarding accuracy of positioning services.

Terminal device positioning may also be important for example in indoor industrial environments, as well as in automotive scenarios such as autonomous driving. Especially in outdoor scenarios accurate positioning can typically be achieved via Global Navigation Satellite System (GNSS). However, there may be limitations which are critical for a ubiquitous service offering of 5G services, since there is no satellite coverage indoors (case of indoor factory scenario), and even outdoors there are limitations of satellite coverage withing tunnels or urban canyons, where 5G positioning coverage can play a vital role to a continuous autonomous service.

Some positioning solutions have been suggested to be used in 5G or NR systems:
Downlink Time Difference of Arrival (DL-TDOA)
Uplink Time Difference of Arrival (UL-TDOA)
Downlink Angle of Departure (DL-AoD)
Uplink Angle of Arrival (UL-AoA)
Multi-cell Round Trip Time (Multi-RTT)

The positioning may be performed at the network side, where the network determines the location of a terminal device, or at the terminal device. In the latter case the terminal device performs positioning measurements and determines the location locally.

A terminal may perform downlink positioning measurements. A transmission point (TRP) of the network, such as a base station or (e/g)NB may transmit positioning reference signals (PRS). In angle-based positioning a terminal device may be configured to measure the time of arrival (ToA) and/or the angle of arrival (AoA) of the received PRS. The ToA measurements, and in some cases the AoA measurements as well, may be reported by the terminal device to the network, which may estimate the location of the terminal device. The measurements may also be processed by the terminal device itself when the terminal device determines its own location.

When downlink positioning measurements are performed and the estimation of the terminal device location is performed based on the measurements, it is usually assumed that the measurements are conducted on a point-specific basis. That is, the terminal device conducts measurements while being at a given point A, and the measurements are used to estimate the location of point A. However, if the terminal device is moving the measurements are taking place across different points in space.

In other words, in the typical positioning approach the mobility of the terminal devices is not considered when estimating the terminal device location. Instead, mobility is treated as having a rather detrimental effect on the positioning accuracy, since it renders positioning measurements outdated if they are not performed relatively fast.

In an embodiment, the movement of the terminal device may be utilised to obtain accurate measurements. By performing frequency offset related measurements at the terminal device and mapping the measurement results to angular information in relation to the TRP transmitting the PRS.

Figure 3:
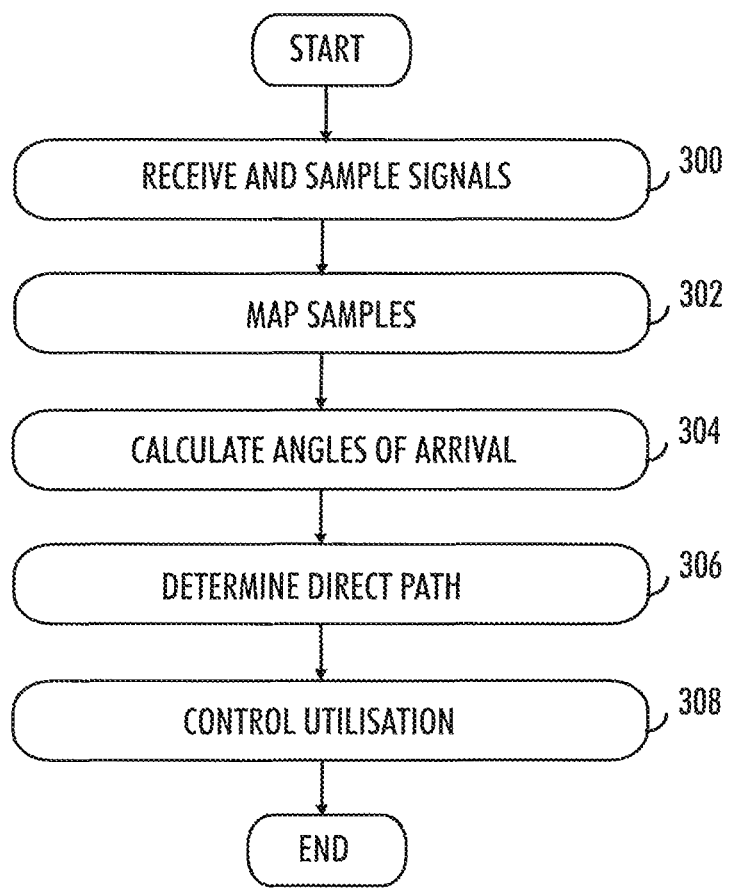
FIG. 3 is a flowchart illustrating an embodiment.

The flowchart of FIG. 3 illustrates an embodiment. The flowchart illustrates an example of the operation of an apparatus. In an embodiment, the apparatus may be a terminal device, user equipment, a part of a terminal device or any other apparatus capable of executing following steps.

In step 300, the apparatus is configured to receive from a network element a signal comprising multipath propagated signal components and to obtain time domain samples of the multipath propagated signal components. The signal may be the PRS, for example.

The apparatus may receive multiple copies or signal components of the signal transmitted by the network element. This may be due to propagation via multiple paths, for example due to reflections from the environment. For example, the apparatus may receive a line-of-sight signal component that has propagated directly from the transmitting network element and one or more signal components that have reflected from surrounding surfaces such as buildings.

In step 302, the apparatus is configured to map the time domain samples to one or more frequency offset-delay pairs or to a frequency offset-delay grid to obtain frequency offsets and delays of the received multipath propagated signal components. In an embodiment, the frequency offset is Doppler shift.

In step 304, the apparatus is configured to calculate angle of arrival of one or more multipath propagated component.

In step 306, the apparatus is configured to determine the multipath propagated signal component corresponding to the direct propagation path between the apparatus and the network element.

In step 308, the apparatus is configured to control the utilisation of the angle of arrival and delay of the multipath propagated signal component corresponding to the direct propagation path in the determination of the location of the apparatus.

In an embodiment, the apparatus is configured to calculate the location of the apparatus utilising of the angle of arrival and delay of the multipath propagated signal component corresponding to the direct propagation path.

In an embodiment, the apparatus is configured to transmit angle of arrival and delay of one or more multipath propagated signal components to a network element configured to determine location of the apparatus. The location of the apparatus may be calculated at the network utilising of the angle of arrival and delay of the multipath propagated signal component corresponding to the direct propagation path.

In an embodiment, the proposed solution maps or projects the received multipath propagated signal components from time domain to frequency offset-delay space or grid. This has not previously been utilised on positioning of terminal devices, especially without a need for perfect synchronization.

The proposed solution does not require time-synchronization and provides accurate estimates of angle of arrival—values of relevant multipath signals of a channel between a TRP and a terminal device. The time-synchronization freedom is achieved by mapping time-domain signal samples to a frequency offset-delay domain space, in which the different copies of the received signal are isolated from one another.

In following, Doppler shift is used as an example of frequency offset.

Figure 4:
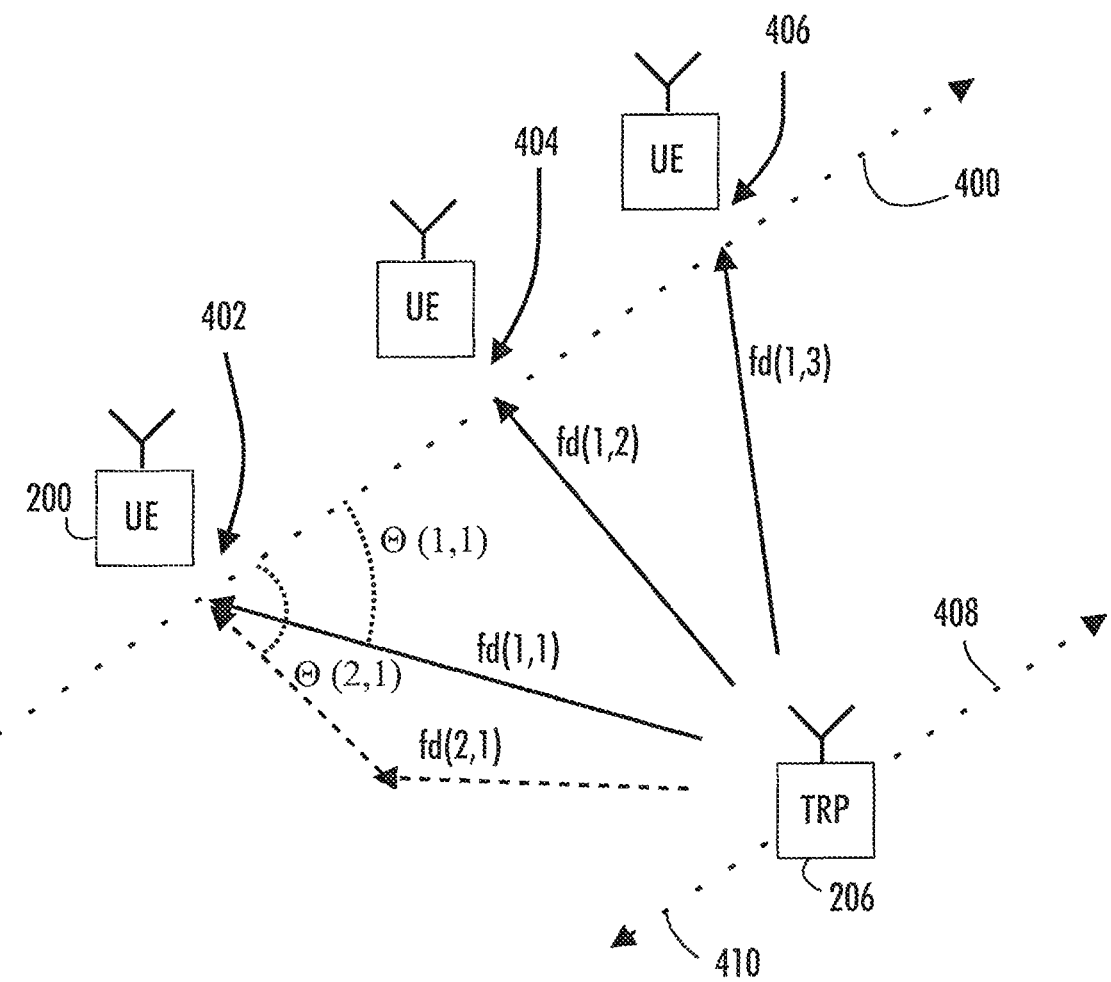
FIG. 4 illustrates an example of a moving terminal device.

FIG. 4 illustrates an example. A terminal device 200 is moving along a route 400. FIG. 4 illustrates three positions, Position 1 402, Position 2 404, and Position 3 406 of the terminal device 200. The terminal device is receiving positioning reference signals transmitted by a transmission point 206 of a network. The transmission point is transmitting over a carrier frequency $f_c$.

In position 402, the terminal device receives the positioning reference signal as two components, a line-of-sight (LOS) path 408 and a reflected path 410. In positions 404 and 406, the terminal device receives the positioning reference signal as a line-of-sight paths 412, 414.

Doppler shift may be denoted as fd(a,b), where a denotes path and b denotes position. Correspondingly, angle-of-arrival may be denoted with $\Theta$(a,b). Thus, in position 402, the LOS path has Doppler shift fd(1,1) and angle-of-arrival $\Theta$(1,1) and the reflected path 410 has Doppler shift fd(2,1) and angle-of-arrival $\Theta$(2,1). Correspondingly the paths of positions 404 and 406 have Doppler shifts fd(1,2), fd(1,3.)

The direction 408 illustrates theoretical minimum $f_c$-fd. The direction 410 illustrates theoretical maximum $f_c$+fd.

In the example of FIG. 4 and below, it is assumed that orthogonal frequency-division multiplexing (OFDM) is used, without limiting the scope of the claims.

Since the terminal device 200 is moving at a relatively high speed, where the Doppler shift is high relative to the subcarrier spacing, each PRS complex symbol is rotated by a normalized Doppler shift. Thus, at the receiving terminal device, each symbol will be combined destructively at reception with the other symbols. In other words, the terminal device does not receive a pure OFDM signal, but a distorted version of the signal. This makes the acquisition of position measurements cumbersome since the standard measurement process relies on the reception of an orthogonal waveform.

In an embodiment, the receiving terminal device is configured to reconstruct a fast-time varying channel by observing corrupted analog-to-digital-converted (ADC) samples. In other words, the terminal device needs to be able to distinguish between each signal reflection, i.e. estimate the delay and the Doppler shift of each reflection, when such reflections destroy the waveform orthogonality.

Figure 5:
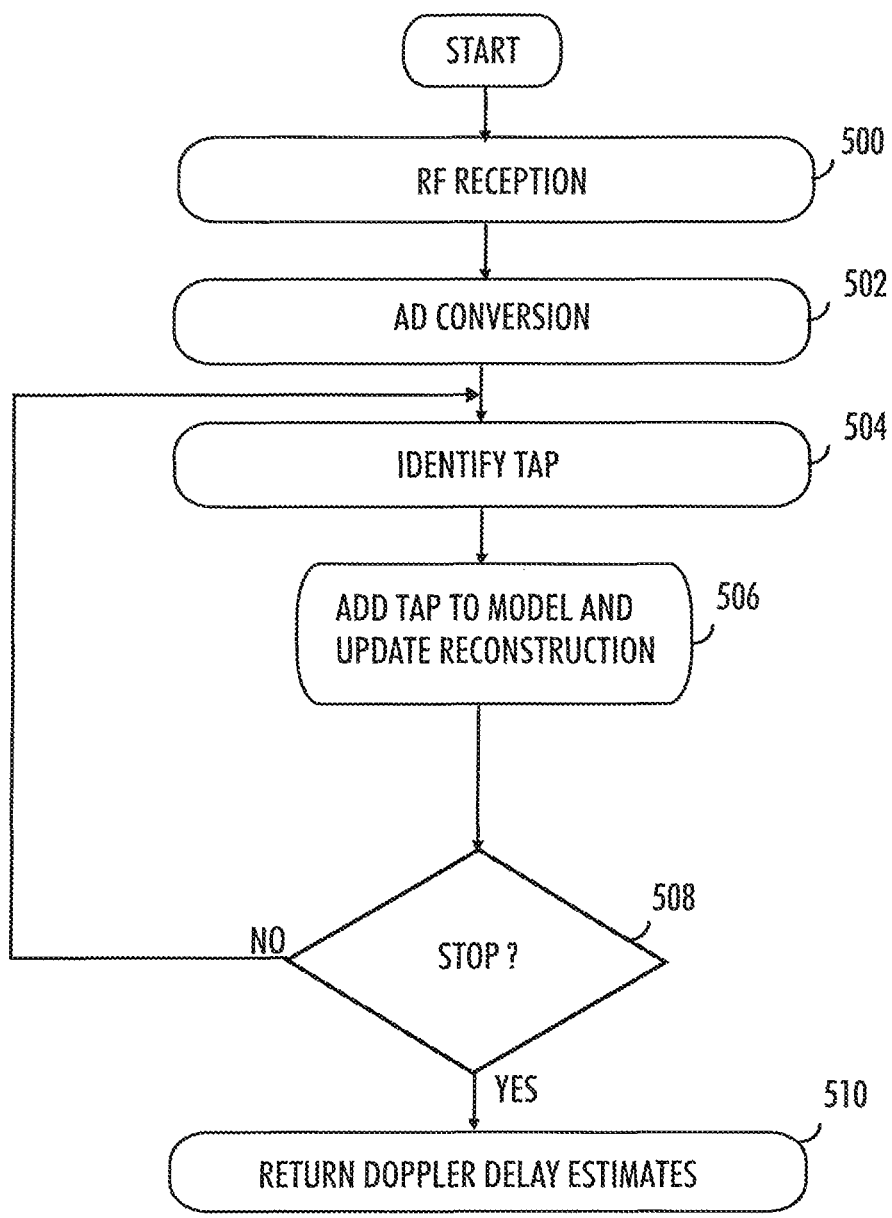
FIGS. 5 and 6 are flowcharts illustrating some embodiments.

FIG. 5 illustrates an embodiment. FIG. 5 is a flowchart illustrating how a terminal device searches on a Doppler-delay grid for taps composing wireless propagation channel.

In step 500, the terminal device is configured to receive the radio frequency signal y from a transmission point.

In step 502, the terminal device is configured to perform analogue/digital conversion to the received signal.

In step 504, the terminal device is configured to identify a tap on a Doppler-delay grid.

Once a tap is found, in step 506, the terminal device is configured to add the tap to reconstructed channel model and subtract the tap's contribution from the time-domain received signal y.

Next, the terminal device is configured to check in step 508 whether to continue searching for taps. In an embodiment, a subsequent tap may be searched until the residual energy (after subtraction from y) is negligible.

The terminal device needs to know how to weigh the contribution of each detected tap to the total received signal before OFDM demodulation. This contribution is proportional to the tap's delay and Doppler shift and thus the procedure outlined in FIG. 5 is performed.

As mentioned, in an embodiment a transmission point (TRP) of the network, such as a base station or a remote radio head transmits a positioning reference signal (PRS). The PRS may be denoted as u(t) and it is transmitted over a carrier frequency $f_c$ and bandwidth B to reach a fast-moving terminal device. It may be noted that the PRS may be expressed as a function of time t since it is typically a beacon carrier signal.

The PRS signal transmitted by a TRP travels over a wireless channel and typically the terminal device receives a signal comprising multipath propagated signal components. The channel response may be denoted as $$h(t) = \sum_{l=0}^{L-1} h_l \exp(2\pi j f_d(l)t) \delta(t - \tau_l)$$

where L is the total number of multipath components, each characterized by a delay $\tau_l$, a complex gain $h_l$ and a Doppler shift $f_d(l)=f_D \cos(\theta_l)$, where $$f_D = \frac{v}{c} f_c$$

is the maximum Doppler shift due to moving at a speed v and $\theta_l$ is the arrival angle and $\delta(t)$ is Dirac delta function.

The terminal device receives the signal $$y(t) = (h*u)(t) + w(t) = \sum_{l=1}^{L} h_l \exp(2\pi j f_d(l)t) u(t - \tau_l) + w(t)$$

where w(t) is an average white gaussian noise process with unknown variance and * denotes convolution. The terminal device samples the signal with resolution $$T_s = \frac{1}{B}.$$

After signal reception and sampling, the k-th sample $y_k$ of the received signal may be denoted as $$y_k = \sum_{l=0}^{V-1} h_l \exp(jk\omega_D \cos(\theta_l)) u_{k-l} + w_k, k = 0:N-1,$$

where $\omega_D=2\pi f_D T_s$ is normalized Doppler shift and $u_{k-l}=u(kT_s-lT_s)$.

From above, it can be seen that there is a dependency between the Doppler shift $f_d(l)$ and the angle of arrival $\theta_l$.

In an embodiment, when delay, Doppler shift and angle of arrival are calculated, a given delay, frequency and angle resolution may be utilized to simplify estimation of delay and angle-of-arrival of dominant path at each location. In other words, the delays and angles are assumed to lie on grids with a given resolution.

For delay $\tau_l$, it may be assumed that $\tau_l=l\Delta\tau$, l=v 0:V−1, where $\Delta\tau$ is a chosen (fine) resolution. For example, the resolution may be a fraction of the sampling time $T_s$ of the system, such as $T_s/10$. A maximum delay search range may be chosen by setting $$V = \left\lceil \frac{RT_{cp}}{\Delta\tau} \right\rceil, R \geq 1.$$

R is a positive integer limiting search space. With a fine delay grid, it can be assumed that the resulting channel vector h is sparse, since, in practice, the channel typically has a few non-negligible multipath components.

In addition, it is approximated that the angle of arrival can be discretized with a given resolution. Thus, with reference to FIG. 4, the angles $\Theta(a,b)$ where a denotes path and b denotes position of the terminal device across its trajectory, are taking discrete values. It may be assumed that $\theta_l=l\Delta\theta$, where $$\Delta\theta = \frac{2\pi}{V-1}$$

is the angular resolution, where V is as above.

Based on above, a Doppler-per-multipath matrix may be defined as $$\Omega(k,l)=\exp(jk\omega_D \cos(l\delta\theta)),$$

received signal spread matrix may be defined as $$U(k,l)=u_{k-l},$$

and a super matrix may be defined as $$G=\Omega \circ U \in C^{N \times V},$$

where ($\circ$) denotes Hadamard product.

In an embodiment, the terminal device is configured to collect N samples of the received signal into a vector y=Gh+w. The matrix G comprises delays and angles-of-arrival. Next, the terminal device may be configured to compute an estimate of the channel impulse response h with the known y so that a selected accuracy metric is optimized. Thus, a least square problem may be solved. There are no unique solutions for the problem, but the calculation may be simplified by enforcing assumed sparsity on the solution h by presenting the problem as mini $\|h\|_0$ so that Gh=y, where $\|\ \|_0$ denotes zero norm.

Solving of h, (obtaining $\hat{h}$), may be performed in various ways. In an embodiment, the channel may be reconstructed with a greedy pursuit (GP) type of approach, such as orthogonal matching pursuit (OMP) or subspace pursuit (SP).

In another embodiment, sparse Bayesian learning (SBL) or approximate inference such as approximate message passing (AMP) may be used. Also, other heuristic methods know in one skilled in the art may be used.

Figure 6:
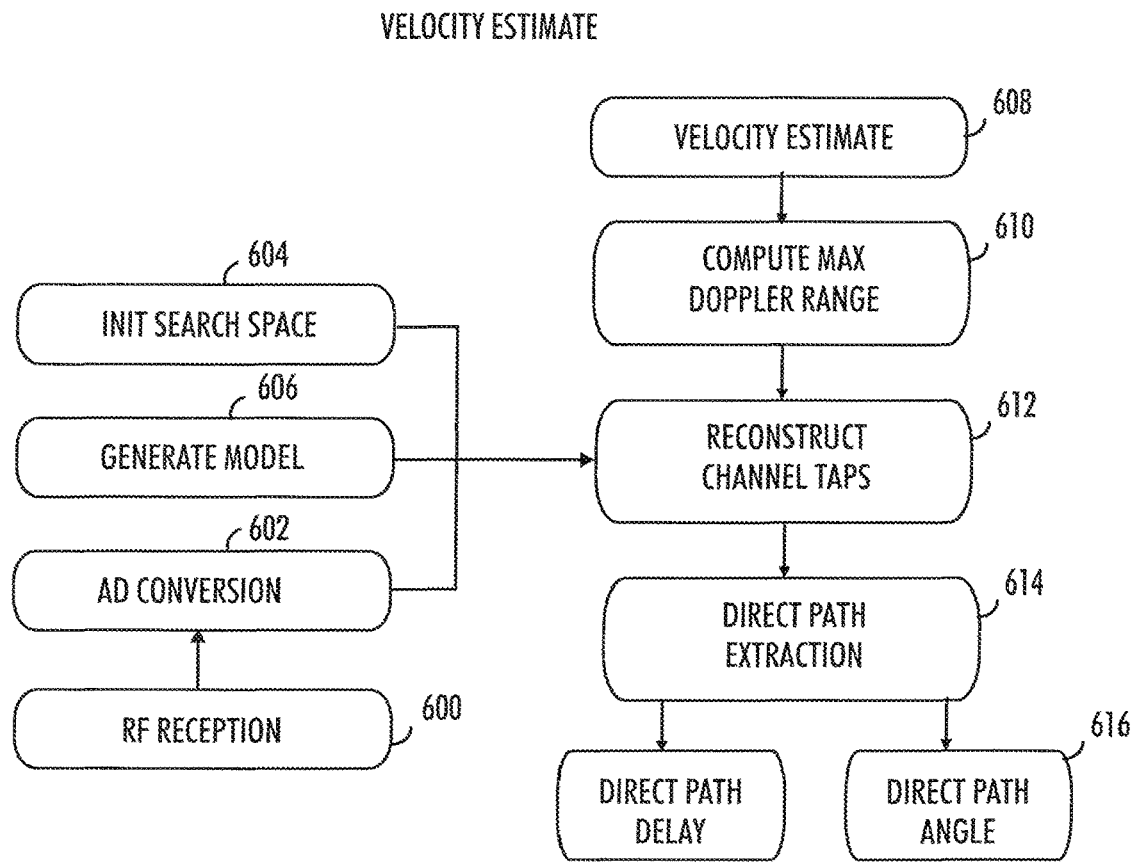

FIG. 6 illustrates an embodiment. FIG. 6 is a flowchart illustrating how a terminal device determines delay and angle-of-arrival of dominant (directly propagated) path of the transmission of a transmission point.

In step 600, the terminal device is configured to receive the radio frequency signal y from a transmission point.

In step 602, the terminal device is configured to perform analogue/digital conversion to the received signal.

In step 604, the terminal device is configured to initialise search space by selecting the length V of search space and selecting delay and Doppler resolutions. These values may be implementation specific. For example, they may be selected assuming a maximum delay spread of the channel and a maximum terminal device speed, for example.

Further, a number K of dominant paths used in calculation is selected. This may be selected by the terminal device, or it may receive them from the network.

In step 606, the terminal device is configured to generate model (Ω, U, G) as described above.

In step 608, the terminal device is configured to obtain velocity estimate of the terminal device.

In step 610, the terminal device is configured to compute maximum Doppler range.

In an embodiment, the maximum Doppler range is [−$f_D$, $f_D$], where $$f_D = \frac{v}{c} * f_c,$$

where v is the velocity of the terminal device, c speed of light and $f_c$ is carrier frequency.

In step 612, the terminal device is configured to reconstruct fast varying channel taps (solving h) utilising OMP, SBL, AMP or other know method as mentioned above.

In step 614, the terminal device is configured to determine direct path delay and angle-of-arrival, as follows.

Based on the reconstructed fast varying channel taps $\hat{h}$, angles-of-arrival and delay of first K dominant paths may be regenerated as follows:

The indices of the K dominant paths, denoted with p are determined by p=argmax K{|h|,K}.

Dominant path delays are $\widehat{\tau_p}$=pΔτ.

Angles-of-arrival are $\widehat{\theta_p}$=pΔθ.

The direct path is the path of first K dominant paths having the shortest delay. The terminal device may report the direct path delay 616 and the direct path angle-of-arrival 618 to network, or it may report all K dominant paths, or a subset of the paths. In an embodiment, the report is sent to LMF of the network, The LMF may control the reporting (what to report or size of the subset, for example).

Figure 7A:
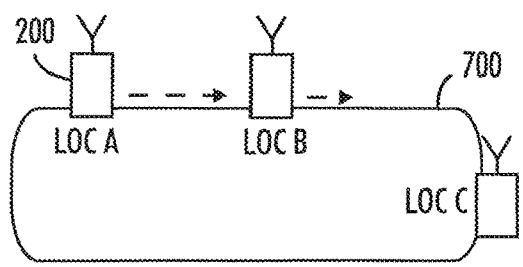
FIGS. 7A and 7B illustrates an example of a terminal device moving on a route.
Figure 7B:
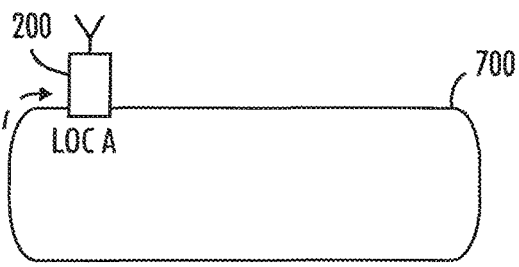
Figure 8:
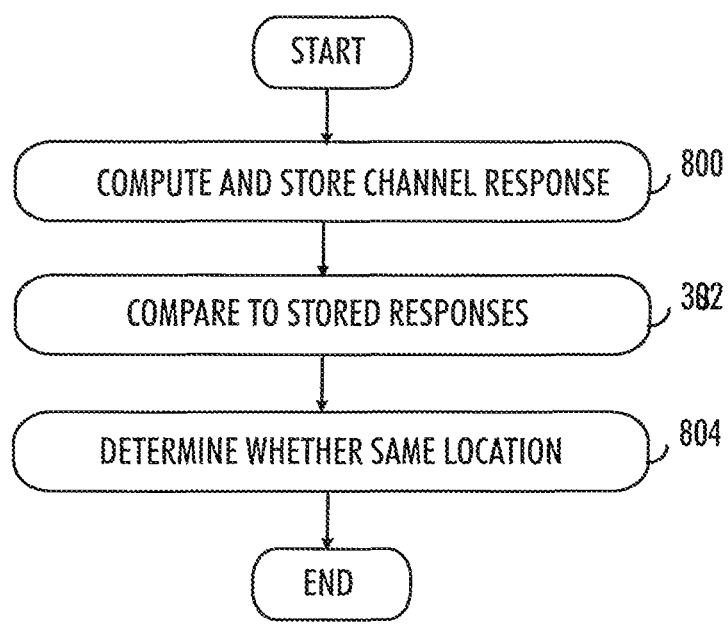
FIG. 8 is a flowchart illustrating an embodiment.

FIGS. 7A, 7B and 8 illustrate an embodiment. The above-described method may be utilised for creating a route trace of the movements of a terminal device. This applies especially in situations where the terminal device 200 is moving a given route 700 repeatedly, for example in a factory or storage facilities. In such situations the propagation conditions are usually very static over a long period of time, especially in indoor environments. Therefore, the propagation conditions may stay the same on several successive passes of the terminal device over the route.

In the example of FIG. 7A, a terminal device is moving on a route 700, going through locations LOC A, LOC B and LOC C, among others.

In step 800, the terminal device is configured to determine and store channel impulse responses for the multipath propagated signals at different time instances when moving along the route. For example, at LOC A the terminal device may calculate and store $H_{r1}$(f) at time instant t1, at LOC B $H_{r2}$(f) at time instant t2 and at LOC A $H_{r3}$(f) at time instant t3.

In step 802, the terminal device is configured to, after calculating a new channel impulse response, compare the obtained impulse response to stored impulse responses.

For example, at time instant t4 the terminal device might be at LOC A again and calculate $H_{r4}$(f). The terminal device may compare the calculated value to stored values.

In step 804, the terminal device is configured to, if the difference between the new impulse response and a stored impulse response is smaller than a given threshold, determine that the new channel impulse response was obtained at the same location as the stored impulse response apparatus. In this case it may turn out, that $H_{r4}$(f)≈$H_{r1}$(f), i.e the calculated value corresponds to the value stored at time instant t1. Thus, the terminal device may determine that the location is the same and that the terminal device is passing the same location for a second time.

The comparison may be performed in various ways known in the art. For example, a mean squared error (MSE) between the current response and all past memorized responses may be calculated. If a response at a given time instant is the same a pass-flag may be marked indicating that a location has been passed again: pass(t')=1 if MSE (t',t) ≤threshold.

In an embodiment, the threshold applied in the comparison may be specific to the terminal device, i.e., left up to the terminal device to select it, or signalled by the network.

In an embodiment, the terminal device may store the flag in internal memory together with the channel information. An example of possible table to be stored is illustrated in Table 1.

TABLE 1

| Timestamp t | Doppler | Delay | Envelope | Pass | Matching timestamp |
| --- | --- | --- | --- | --- | --- |
| T1 | (D1, ... Dp) | (d1, ..., dp) | (a1, ..., ap) | 1 | Tx |

The terminal device may create a route trace by performing above comparisons and storing results. The terminal device may determine, that LOCB follows LOC B, for example. The terminal device may transmit determined information to network for enhancing location estimation process.

The proposed solution has many advantages. It assists accurate positioning for moving terminal device by providing accurate delay and angle-of-arrival information both in outdoor and indoor environments. The network may also correct the terminal device's positioning if the positioning report arrives with large delay.

In an embodiment, the proposed solution enables predicting position of a terminal device and tracking the location of the terminal device in factory and storage environments for example for Internet of Things applications.

The proposed solution allows exploiting the Doppler for positioning for enhancing the positioning accuracy of mobile target terminal devices. This is an inherent element of mobile terminal devices that provides additional information on a terminal device location, yet existing approaches have not taken advantage of it.

In an embodiment, the proposed solution enables positioning in required level for 5G applications by higher accuracy and reduces uncertainty by refining the terminal device location.

The solution is flexible as resolution of search space may be controlled according to need and it is possible to trade between performance and complexity.

Figure 9:
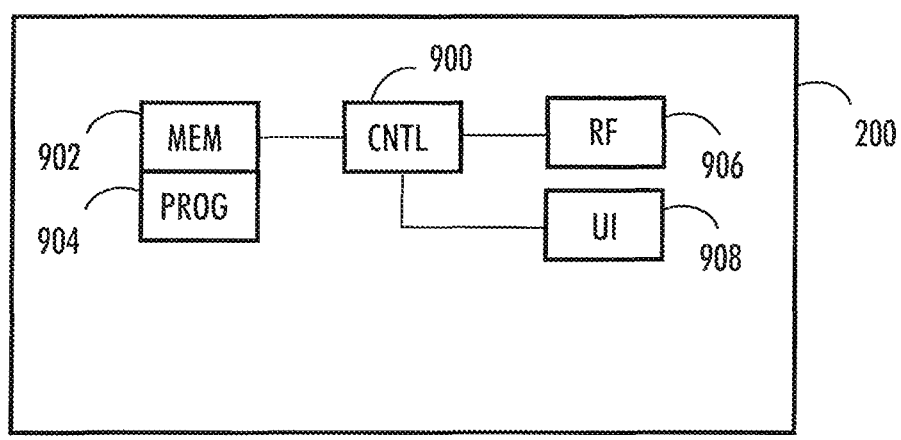
FIG. 9 illustrate an example of an apparatus.

FIG. 9 illustrates an embodiment. The figure illustrates a simplified example of an apparatus applying embodiments of the invention. In some embodiments, the apparatus may be a terminal device 200, or a part of a terminal device of a telecommunication system.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus 200 of the example includes a control circuitry 900 configured to control at least part of the operation of the apparatus.

The apparatus may comprise a memory 902 for storing data. Furthermore, the memory may store software 904 executable by the control circuitry 900. The memory may be integrated in the control circuitry.

The apparatus may comprise one or more interface circuitries 906. The interface circuitries are operationally connected to the control circuitry 900. An interface circuitry 906 may be a set of transceivers configured to communicate with a RAN node, such as an (e/g)NodeB of a wireless communication network. The interface circuitry may be connected to an antenna arrangement (not shown). The apparatus may also comprise a connection to a transmitter instead of a transceiver. The apparatus may further comprise a user interface 908.

In an embodiment, the software 904 may comprise a computer program comprising program code means adapted to cause the control circuitry 900 of the apparatus to realise at least some of the embodiments described above.

The steps and related functions described in the above and attached figures are in no absolute chronological order, and some of the steps may be to performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, processing system or a circuitry which may comprise a working memory (random access memory, RAM), a central processing unit (CPU), and a system clock. The CPU may comprise a set of registers, an arithmetic logic unit, and a controller. The processing system, controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute at least the following: receive from a network element a signal comprising multipath propagated signal components and obtain time domain samples of the multipath propagated signal components; map the time domain samples to one or more frequency offset-delay pairs to obtain frequency offsets and delays of the received multipath propagated signal components; calculate angle of arrival of one or more multipath propagated signal components; determine the multipath propagated signal component corresponding to the direct propagation path between the apparatus and the network element; control the utilisation of the angle of arrival and delay of the signal component corresponding to the direct propagation path in the determination of the location of the apparatus.

An embodiment provides a non-transitory computer readable medium comprising program instructions for causing an apparatus to perform at least the following: receive from a network element a signal comprising multipath propagated signal components and obtain time domain samples of the multipath propagated signal components; map the time domain samples to one or more frequency offset-delay pairs to obtain frequency offsets and delays of the received multipath propagated signal components; calculate angle of arrival of one or more multipath propagated signal components; determine the multipath propagated signal component corresponding to the direct propagation path between the apparatus and the network element; control the utilisation of the angle of arrival and delay of the signal component corresponding to the direct propagation path in the determination of the location of the apparatus.

An embodiment provides a computer readable medium comprising program instructions for causing an apparatus to perform at least the following: receive from a network element a signal comprising multipath propagated signal components and obtain time domain samples of the multipath propagated signal components; map the time domain samples to one or more frequency offset-delay pairs to obtain frequency offsets and delays of the received multipath propagated signal components; calculate angle of arrival of one or more multipath propagated signal components; determine the multipath propagated signal component corresponding to the direct propagation path between the apparatus and the network element; control the utilisation of the angle of arrival and delay of the signal component corresponding to the direct propagation path in the determination of the location of the apparatus.

An embodiment provides a communication system comprising an apparatus comprising means for receiving from a network element a signal comprising multipath propagated signal components and obtain time domain samples of the multipath propagated signal components; means for mapping the time domain samples to one or more frequency offset-delay pairs to obtain frequency offsets and delays of the received multipath propagated signal components; means for calculating angle of arrival of one or more multipath propagated signal components; means for determining the multipath propagated signal component corresponding to the direct propagation path between the apparatus and the network element; means for controlling the utilisation of the angle of arrival and delay of the multipath propagated signal component corresponding to the direct propagation path in the determination of the location of the apparatus.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst several computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus comprising at least one processor; and at least one memory storing instructions that, when executed by the at least one processor, cause the apparatus at least to:
   receive from a network element a signal comprising multipath propagated signal components and obtain time domain samples of the multipath propagated signal components;
   map the time domain samples to one or more frequency offset-delay pairs to obtain delays of the received multipath propagated signal components;
   calculate angle of arrival of one or more of the multipath propagated signal components;
   determine the multipath propagated signal component among the multipath propagated signal components corresponding to the direct propagation path between the apparatus and the network element; and
   use the angle of arrival and delay of the signal component corresponding to the direct propagation path in determining a location of the apparatus.

2. The apparatus of claim 1, the at least one memory and the instructions further configured to, when executed by the at least one processor, cause the apparatus to:
   calculate the location of the apparatus utilising the angle of arrival and delay of the multipath propagated signal component corresponding to the direct propagation path.

3. The apparatus of claim 1, the at least one memory and the instructions further configured to, when executed by the at least one processor, cause the apparatus to:
   transmit angle of arrival and delay of one or more multipath propagated signal component to a network element configured to determine location of the apparatus.

4. The apparatus of claim 1, the at least one memory and the instructions further configured to, when executed by the at least one processor, cause the apparatus to:
   when estimating delay, frequency offset and angle of arrival, utilise a given delay, frequency, and angle resolution.

5. The apparatus of claim 1, the at least one memory and the instructions further configured to, when executed by the at least one processor, cause the apparatus, when determining the signal component corresponding to the direct propagation path between the apparatus and the network element, to:
   determine channel impulse response for the multipath propagated signals;
   determine a set of strongest received multipath propagated signals; and
   determine the multipath propagated signal component corresponding to the direct propagation path between the apparatus and the network element as the multipath propagated signal having the shortest delay of the set of multipath propagated signals.

6. The apparatus of claim 1, the at least one memory and the instructions further configured to, when executed by the at least one processor, cause the apparatus to:
   store channel impulse responses for the multipath propagated signal components at different time instances;
   after calculating a new channel impulse response, compare the obtained impulse response to stored impulse responses; and
   if the difference between the new impulse response and a stored impulse response is smaller than a given threshold, determine that the new channel impulse response was obtained at the same location as the stored impulse response apparatus.

7. The apparatus of claim 1, the at least one memory and the instructions further configured to, when executed by the at least one processor, cause the apparatus to:
transmit information of the location to a network.

8. The apparatus of claim 1, wherein the frequency offset is a Doppler shift.

9. A communication system comprising an apparatus comprising at least one processor; and at least one memory storing instructions that, when executed by the at least one processor, cause the apparatus to:
receive from a network element a signal comprising multipath propagated signal components and obtain time domain samples of the multipath propagated signal components;
map the time domain samples to one or more frequency offset-delay pairs to obtain delays of the received multipath propagated signal components;
calculate angle of arrival of one or more of the multipath propagated signal components;
determine the multipath propagated signal component among the multipath propagated signal components corresponding to the direct propagation path between the apparatus and the network element; and
use the angle of arrival and delay of the signal component corresponding to the direct propagation path in determining a location of the apparatus.

10. A method in an apparatus, comprising:
receiving from a network element a signal comprising multipath propagated signal components and obtaining time domain samples of the multipath propagated signal components;
mapping the time domain samples to one or more frequency offset-delay pairs to obtain delays of the received multipath propagated signal components;
calculating angle of arrival of one or more of the multipath propagated signal components;
determining the multipath propagated signal component among the multipath propagated signal components corresponding to the direct propagation path between the apparatus and the network element; and
using the angle of arrival and delay of the multipath propagated signal component corresponding to the direct propagation path in determining a location of the apparatus.

11. The method of claim 10, further comprising:
calculating the location of the apparatus utilising of the angle of arrival and delay of the multipath propagated signal component corresponding to the direct propagation path.

12. The method of claim 10, further comprising:
transmitting angle of arrival and delay of one or more multipath propagated signal components to a network element configured to determine location of the apparatus.

13. The method of claim 10, further comprising: when estimating delay, frequency offset and angle of arrival, utilising a given delay, frequency, and angle resolution.

14. The method of claim 10, further comprising:
determining channel impulse response for the multipath propagated signal components;
determining a set of strongest received multipath propagated signal components; and
determining the multipath propagated signal component corresponding to the direct propagation path between the apparatus and the network element as the multipath propagated signal having the smallest delay of the set of signals.

15. The method of claim 10, further comprising:
storing channel impulse responses for the multipath propagated signal components at different time instances;
after calculating a new channel impulse response, comparing the obtained impulse response to stored impulse responses; and
if the difference between the new impulse response and a stored impulse response is smaller than a given threshold, determining that the new channel impulse response was obtained at the same location as the stored impulse response apparatus.

16. The method of claim 10, wherein the frequency offset is a Doppler shift caused by the relative movement of the apparatus with respect to the network element.

17. A non-transitory computer readable medium comprising program instructions that, when executed by an apparatus, cause the apparatus to to perform at least the following
receive from a network element a signal comprising multipath propagated signal components and obtain time domain samples of the multipath propagated signal components;
map the time domain samples to one or more frequency offset-delay pairs to obtain delays of the received multipath propagated signal components;
calculate angle of arrival of one or more of the multipath propagated signal components;
determine the multipath propagated signal component among the multipath propagated signal components corresponding to the direct propagation path between the apparatus and the network element; and
use the angle of arrival and delay of the signal component corresponding to the direct propagation path determining a location of the apparatus.

18. The apparatus of claim 1, wherein the apparatus is a terminal device or a user equipment.

19. The communication system of claim 9, wherein the apparatus is a terminal device or a user equipment.

20. The method of claim 10, wherein the apparatus is a terminal device or a user equipment.

\* \* \* \* \*